(12) United States Patent
Ando

(10) Patent No.: US 8,073,159 B2
(45) Date of Patent: Dec. 6, 2011

(54) MIXER CONTROLLER

(75) Inventor: Takeshi Ando, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1623 days.

(21) Appl. No.: 11/213,070

(22) Filed: Aug. 24, 2005

(65) Prior Publication Data

US 2006/0045292 A1 Mar. 2, 2006

(30) Foreign Application Priority Data

Aug. 25, 2004 (JP) ................................. 2004-245437

(51) Int. Cl.
*H04B 1/00* (2006.01)
(52) U.S. Cl. ........................................... 381/119; 369/4
(58) Field of Classification Search .................. 381/119; 700/94; 369/1, 4; 84/625, 660, 687
See application file for complete search history.

(56) References Cited

U.S. PATENT DOCUMENTS

| | | | | |
|---|---|---|---|---|
| 5,444,789 | A * | 8/1995 | Zampini et al. | 381/119 |
| 5,467,102 | A | 11/1995 | Kuno et al. | |
| 5,524,060 | A * | 6/1996 | Silfvast et al. | 381/104 |
| 5,774,566 | A * | 6/1998 | Huber et al. | 381/119 |
| 5,892,938 | A * | 4/1999 | Eastty et al. | 710/8 |
| 5,930,375 | A * | 7/1999 | East et al. | 381/119 |
| 6,804,565 | B2 * | 10/2004 | Eid | 700/94 |
| 7,045,699 | B2 * | 5/2006 | Okabayashi | 84/625 |
| 7,436,971 | B2 | 10/2008 | Terada et al. | |

FOREIGN PATENT DOCUMENTS

| | | |
|---|---|---|
| EP | 1 561 496 A | 8/2005 |
| GB | 2 330 750 A | 4/1999 |
| JP | 04-322524 A | 11/1992 |
| JP | 10-084241 A | 3/1998 |
| JP | 2003-108139 A | 4/2003 |
| JP | 2004-072295 A | 3/2004 |

OTHER PUBLICATIONS

Notification of First Office Action for Chinese Patent Application No. 2005100930158, issued Dec. 5, 2008 (10 pages).
Notification of Reason(s) for Refusal mailed Jun. 23, 2009, for JP Application No. 2004-245437, with English translation, six pages.
Decision of Rejection mailed Oct. 6, 2009, for JP Application No. 2004-245437, with English Translation, four pages.
PM1D Manager for Windows Operating Manual by Yamaha Corporation, Japan, 2002.
CS1D Control Surface Reference Manual (Hardware), PM1D Digital Audio Mixing System by Yamaha Corporation, 114 pages, 2000.

* cited by examiner

*Primary Examiner* — Xu Mei
(74) *Attorney, Agent, or Firm* — Morrison & Foerster LLP

(57) ABSTRACT

A controller controls a mixing processor based on an operation in an operating portion. Besides, the controller causes a first display to display a view showing an entire console for controlling a parameter for signal processing in a mixing processor, and causes a second display to display a view showing a designated partial area of the above described control panel. Further, the controller accepts designation of any control in the view displayed by the second display, assigns a parameter corresponding to the control of which designation is accepted, and causes the mixing processor to change a value of the parameter assigned to the operating portion, in accordance with an operation content when the operating portion is operated.

13 Claims, 7 Drawing Sheets

| AREA | CONTROL | CATEGORY | PAARAMETER (LAYER 1) | PARAMETER (LAYER 2) | ... |
|---|---|---|---|---|---|
| INPUT1 | ch1FADER | SLIDER | ch1FADER | ch49FADER | ... |
| | ch1ON | BUTTON | ch1ON | ch49ON | ... |
| | ch1SEL | BUTTON | ch1SEL | ch49SEL | ... |
| | ch1GAIN | ENCODER | ch1GAIN | ch49GAIN | ... |
| | ch1SEL | ENCODER | ch1SEL | ch49SEL | ... |
| | : | : | : | : | : |
| INPUT2 | : | : | : | : | : |

F I G. 8

| AREA | CONTROL | CATEGORY | PAARAMETER (LAYER 1) | PARAMETER (LAYER 2) | ... |
|---|---|---|---|---|---|
| INPUT1 | ch1FADER | SLIDER | ch1FADER | ch49FADER | ... |
| | ch1ON | BUTTON | ch1ON | ch49ON | ... |
| | ch1SEL | BUTTON | ch1SEL | ch49SEL | ... |
| | ch1GAIN | ENCODER | ch1GAIN | ch49GAIN | ... |
| | ch1SEL | ENCODER | ch1SEL | ch49SEL | ... |
| | ⋮ | ⋮ | ⋮ | ⋮ | ⋮ |
| INPUT2 | ⋮ | ⋮ | ⋮ | ⋮ | ⋮ |

MIXER CONTROLLER

BACKGROUND OF THE INVENTION

1. Field of the Invention

The invention relates to a mixer controller which controls a mixing processor that processes inputted audio signals and outputs the audio signals, a mixer system having the mixing processor as described above and a controller which controls the mixing processor, and a program causing a computer to function as the mixer controller as described above.

2. Description of the Related Art

Conventionally, there has been a known digital mixer which performs various kinds of signal processing such as mixing, equalizing, level adjustment and the like for inputted audio signals and outputs the audio signals.

In such a digital mixer, in order to designate a content of signal processing, a user can set values of various parameters of an input level and an output level for each channel, setting of a filter used for equalizing, setting of a channel used for mixing and the like. Such settings are generally performed by controls disposed on a console, and use of such a control panel provides the advantage of easily confirming a situation of entire settings.

There is known a mixer system in which a mixer engine that performs signal processing and a console including controls are constructed to be separate bodies. Further, in such a mixer system, a PC (Personal Computer) is caused to execute a predetermined control program, so that a parameter for signal processing can be set through GUI (Graphical User Interface) displayed on a display of the PC.

Such a mixer system and a control program are described in, for example, operation manual instructions of the console "CS1D (trade name)" and the application program "PM1D Manager for Windows (trade name)" sold on market by YAMAHA CORPORATION.

SUMMARY OF THE INVENTION

However, whether it is the case where a control panel is provided at a main body of a digital mixer, or the case where a separate console is used, when the number of parameters to be set increases due to increase in the number of input channels for signal input and output channels for signal output, or the like, the number of necessary controls also increases, which causes increase in size of the console.

When the console increases in size, there arises the problems that it becomes necessary to move an entire body to touch a control desired to operate to decrease operability, it takes time and trouble to carry and install the console, and a large installation place is required. Besides, when a number of controls are disposed, there also arises the problem that the price becomes high.

When a control is performed by using the GUI from the PC or the like, the size of the PC itself does not increase, but in order to accept an operation instruction, controls on the GUI cannot be displayed to be so small, and therefore, there arises the problem that when the number of controls increases, the burden of scrolling and switching a view to display a control desired to operate becomes large. The operation on the GUI is performed by using a pointing device such as a mouse, a track ball or the like, which gives a different operation feeling from use of exclusive controls, and there arises the problem that a delicate operation is hard to perform.

An object of the invention is to solve the above-described problems and to make it possible to set a number of parameters used for signal processing in a digital mixer with a compact console with favorable operability.

To achieve the above described objects, a mixer controller of the invention includes, in a mixer controller that detects an operation in an operating portion and controls a mixing processor that processes an inputted audio signals and outputs the audio signals, based on the operation, a first display controller that causes a first display to display a view showing an entire console for controlling a parameter for signal processing in the mixing processor, a second display controller that causes a second display to display a view showing a designated partial area of the console, an accepting device that accepts designation of any control in the view displayed by the second display, an assigning device that assigns the control of which designation the accepting device accepts or a parameter corresponding to the control, to the operating portion, and a parameter controller that causes the mixing processor to change a value of a parameter corresponding to the control assigned to the operating portion or the parameter assigned to the operating portion, in accordance with an operation content when the operating portion is operated.

In such a mixer controller, it is preferable that the first display controller is provided with a display controller that updates a display content of the view showing the entire console in accordance with a content of signal processing in the mixing processor, and the second display controller is provided with a display controller that updates a display content of the view showing the partial area in accordance with the content of signal processing in the mixing processor.

Besides, it is preferable that the first display and the second display are displays that are included in different devices.

Besides, the view displayed by the first display may be a view that displays the entire console in a state with no need of a scroll.

The view showing the entire console may be always displayed by the first display while the mixer controller is operating.

The view displayed by the second display may be a view showing the designated partial area by enlarging it to such a size that a control can be individually designated.

The view showing the entire console may be divided into a plurality of areas in advance, and by a divided unit, designation of an area to be displayed by the second display may be accepted.

The first display controller may be provided with a device that makes a special display different from that of other areas for the area that is designated as an area displayed by the a second display, in the view displayed by the first display.

The second display controller may be provided with a device that makes a special display different from that of other parts for the control of which designation the accepting device accepts, in the view displayed by the second display.

The first display may be a display including a touch panel or a pen tablet, and designation of the area to be displayed by the second display may be accepted by touch or a pen.

The second display may be a display including a touch panel or a pen tablet, and the accepting device may accept the designation of the control by touch or a pen.

The operating portion may be provided with a control in each category with respect to a plurality of categories, and the assigning device may be a device that assigns the control of which assignment the accepting device accepts or a parameter corresponding to the control to a control in a same category as that of the control of which assignment is accepted, in the operating portion.

Besides, a mixer system of the invention is such that in the mixer system having an operating portion, a mixing processor that processes inputted audio signals and to outputs the audio signals, a controller that detects an operation in the operating portion and controls the mixing processor based on the operation, and a first and a second displays, the controller is provided with the same devices as those of the mixer controller.

Besides, a program of the invention is a computer program containing program instructions executable by a computer and causing the computer to execute respective processes for realizing the same control functions as the mixer controller.

The above and other objects, features and advantages of the invention will be apparent from the following detailed description which is to be read in conjunction with the accompanying drawings.

BRIEF DESCRIPTION OF THE DRAWINGS

FIG. 8 is a diagram showing an example of information relating to controls provided on a console displayed by the first display.

DETAILED DESCRIPTION OF THE PREFERRED EMBODIMENTS

Hereinafter, a preferred embodiment for carrying out the invention will be concretely described based on the drawings.

Figure 1:
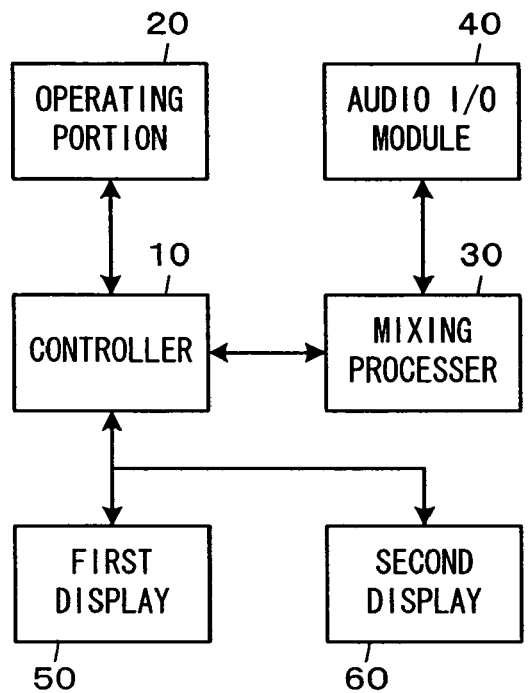
FIG. 1 is a block diagram showing an entire configuration of an embodiment of a mixer system of the invention.

First, FIG. 1 shows an entire configuration of an embodiment of a mixer system of the invention.

As shown in FIG. 1, the mixer system includes a controller 10, an operating portion 20, a mixing processor 30, an audio input/output (I/O) module 40, a first display 50, and a second display 60, and is constructed by connecting them by using a proper connection I/F. Here, each of them is composed as an independent device.

First, the controller 10 is composed of a computer such as a PC or the like, and is an embodiment of a mixer controller of the invention. The controller 10 functions as a controller which controls the entire mixer system.

Figure 2:
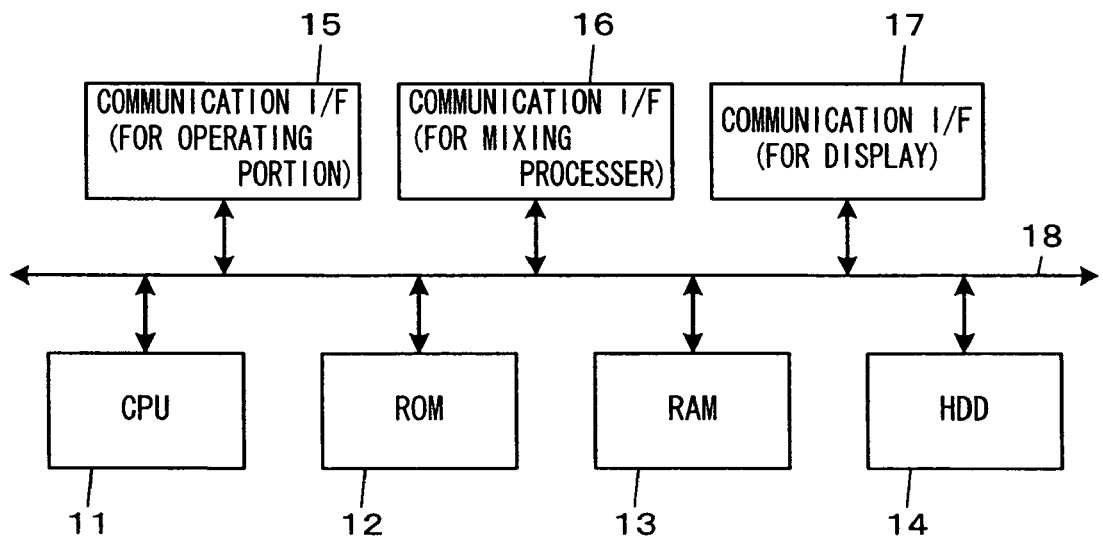
FIG. 2 is a diagram showing a configuration of a controller shown in FIG. 1 in more detail.

FIG. 2 shows a configuration of a main part of the controller 10 in more detail, and as shown in the drawing, the controller 10 includes a CPU 11, a ROM 12, a RAM 13, an HDD (Hard Disk Drive) 14, and communication interfaces (I/F) 15 to 17 for sending/receiving data to/from the operating portion 20, the mixing processor 30, the first and the second displays 50 and 60, which are connected by a system bus 18.

Among them, the CPU 11, which is a main controller in the controller 10, executes a predetermined control program stored in the ROM 12 or the HDD 14 to detect operation contents in the operating portion 20, and the first and the second displays 50 and 60, and performs a process for controlling the mixing processor 30 and controlling the contents of views displayed by the first and second displays 50 and 60, in accordance with the operation contents. Besides, the CPU 11 detects a process content in the mixing processor 30 and also performs process of controlling the contents of the views displayed by the first and the second displays 50 and 60 in accordance with the process content.

Besides, the ROM 12 is a memory that stores a control program executed by the CPU 11, fixed data, and so on. The ROM 12 may be made a rewritable memory to make it possible to update a program and data.

The RAM 13 is a memory that is used as a work memory of the CPU 11 and temporarily stores necessary data.

The HDD 14 is a memory that stores data which is rewritten or selectively used as necessary, such as control programs executed by the CPU, parameters set by a user, display data differing in accordance with the kind of the mixing processor 30 to be controlled, data relating to the function of each control on the console displayed by the first and the second displays 50 and 60 as will be described later, or the like.

As the communication I/Fs 15 to 17, for example, an I/F for sending/receiving data in accordance with the USB (Universal Serial Bus) standards, for example, can be used, but it is possible to use I/Fs of the other standards as a matter of course.

Next, the operating portion 20 shown in FIG. 1 is a unit including necessary controls for setting parameters for signal processing in the mixing processor 30, connected to the controller 10, and has the function of transmitting an operation content to the controller 10 when each control is operated.

Figure 3:
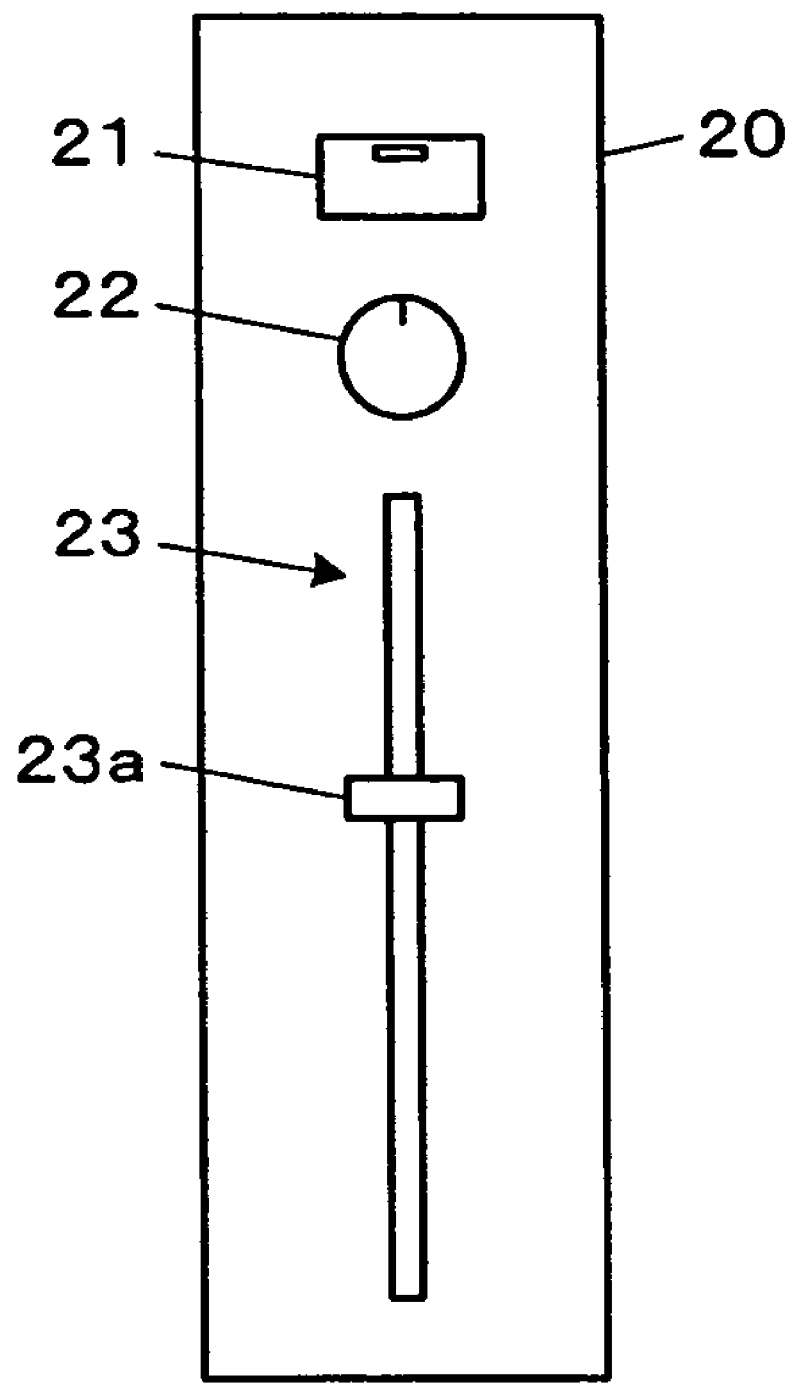
FIG. 3 is a diagram showing a configuration of a control provided in an operating portion shown in FIG. 1 in more detail.

FIG. 3 shows a configuration of the controls provided in this operating portion 20 in more detail. Note that in this drawing, illustration of a cable, a connector and the like for connecting with the controller 10 is omitted.

As shown in the drawing, the operating portion 20 is provided with each one control of controls of a button 21, a rotary encoder 22, and a slider 23. These controls are for setting the values of parameters for signal processing in the mixing processor 30. Though the details will be described later, each of the controls can be assigned with a control selected in the views displayed by the first and the second displays 50 and 60, or a parameter corresponding to the control, so that each of the controls can function as a control for controlling the value of the parameter corresponding to the assigned control or the assigned parameter.

Besides, as the controls provided in the operating portion 20, among the necessary controls for setting of the values of the parameters for signal processing in the mixing processor 30, one control in each category, which is classified in accordance with a shape or an operating method, is sufficient. Since controls for three categories of the button, rotary encoder (knob) and slider (fader) are used for setting of the parameters in this case, each of these controls is provided in the operating portion 20.

Note that, it is preferable that the slider 23 is provided with a driver such as a motor or the like, so that when a control is assigned to the slider 23, a knob 23a can be moved to a position corresponding to the value of the parameter corresponding to the assigned control by control of the CPU 11.

Though in such an operating portion 20, a plurality of controls in the same category can be provided and the category can be further divided into small categories, the number of required controls can be drastically decreased in comparison with the case of the console of the conventional mixer, and the operating portion can be made compact.

Next, the mixing processor 30 shown in FIG. 1 is an audio signal processor having the function of performing various kinds of signal processing such as mixing, equalizing and so on for inputted audio signals and outputting the audio signals, and can be composed as a processor having, for example, a DSP (Digital Signal Processor). The content of the signal processing is the same as the known one, and the detailed explanation will be omitted, but the function of signal processing may be realized by software or may be realized by hardware. Besides, the mixing processor 30 is connected to the controller 10, and also has the function of setting the values of parameters for signal processing in accordance with the instruction from the controller 10 and notifying the controller 10 of the values of the parameters, the content of the signal processing under execution and so on.

Besides, the audio input/output (I/O) module 40 is connected to the mixing processor 30, and has the function of receiving input of signals to be processed in the mixing processor 30 and outputting the processed signals. More specifically, the audio input/output (I/O) module 40 includes an audio input device which generates or detects sound to be subjected to signal processing and inputs it into the mixing processor 30 as an audio signal, such as a sound generator device, a mike and so on, and an audio output device which receives the audio signal after mixing and plays it, such as a speaker, an amplifier, and so on. It is also possible to connect another mixer as the audio input device or the output device.

The first and the second displays 50 and 60 are respectively connected to the controller 10, and are the first and the second display devices which display views based on the instruction from the controller 10. The first and the second displays 50 and 60 each have the function of detecting an operation for a part of the displayed view and transmitting the content of it to the controller 10. It is conceivable that each of these displays is composed as a touch panel display or a pen tablet display.

Besides, as for these displays, the display having the length of the diagonal line of the display area of about 14 to 15 inches is preferable, because if the size is too small, the display area of sufficient extent cannot be secured, and if the size is too large on the other hand, increase in a space required for installation and increase in cost become a problem. Connection of the first and the second displays 50 and 60 with the controller 10 may be performed individually, or the second display 60 may be connected to the controller 10 via the first display 50, or the connection in the inverse sequence may be adopted.

The differences between these first and the second displays 50 and 60 are contents of the displayed views and action of each part when the operation is performed for the view.

Figure 4:
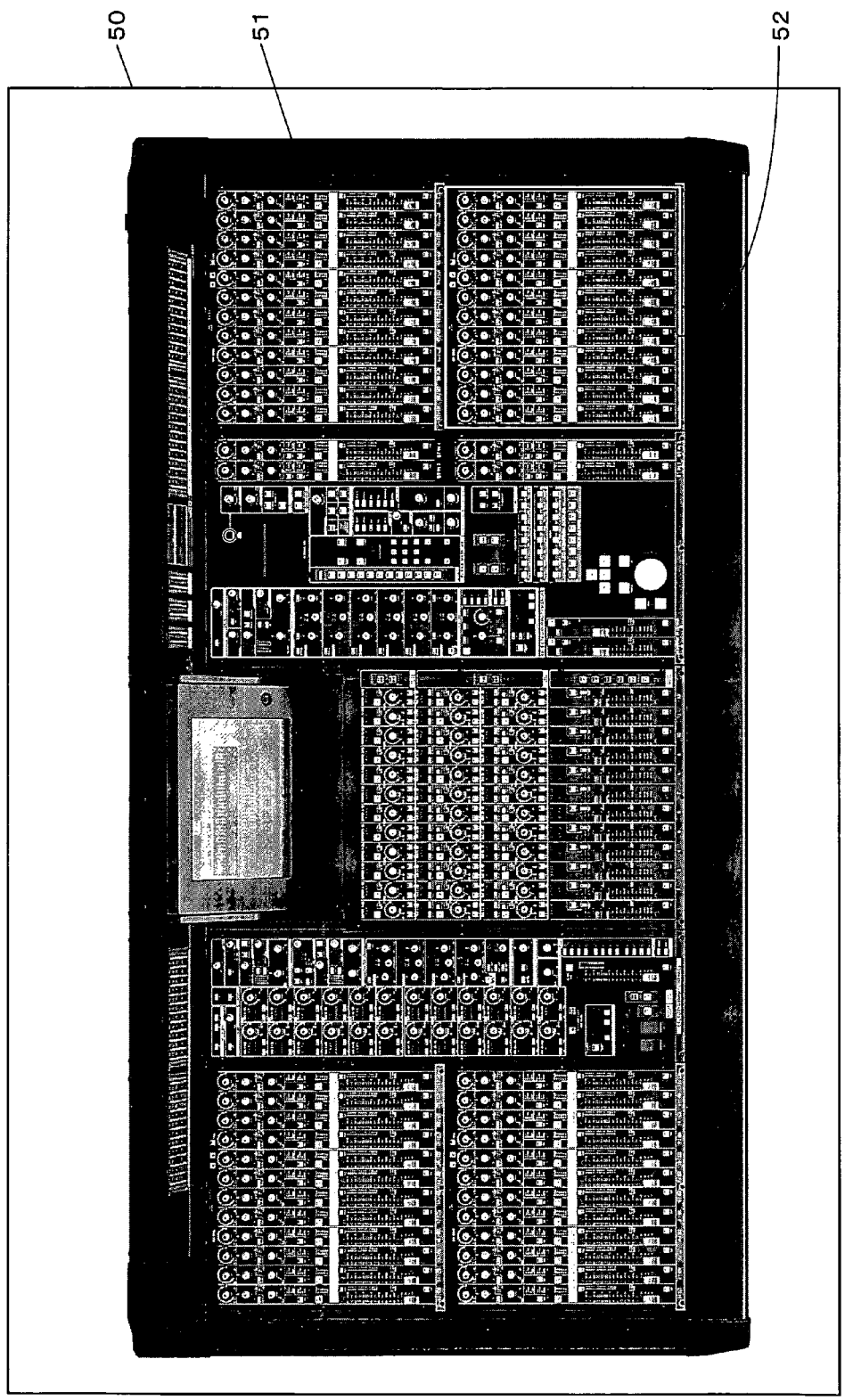
FIG. 4 is a diagram showing an example of a view displayed by a first display shown in FIG. 1.
Figure 5:
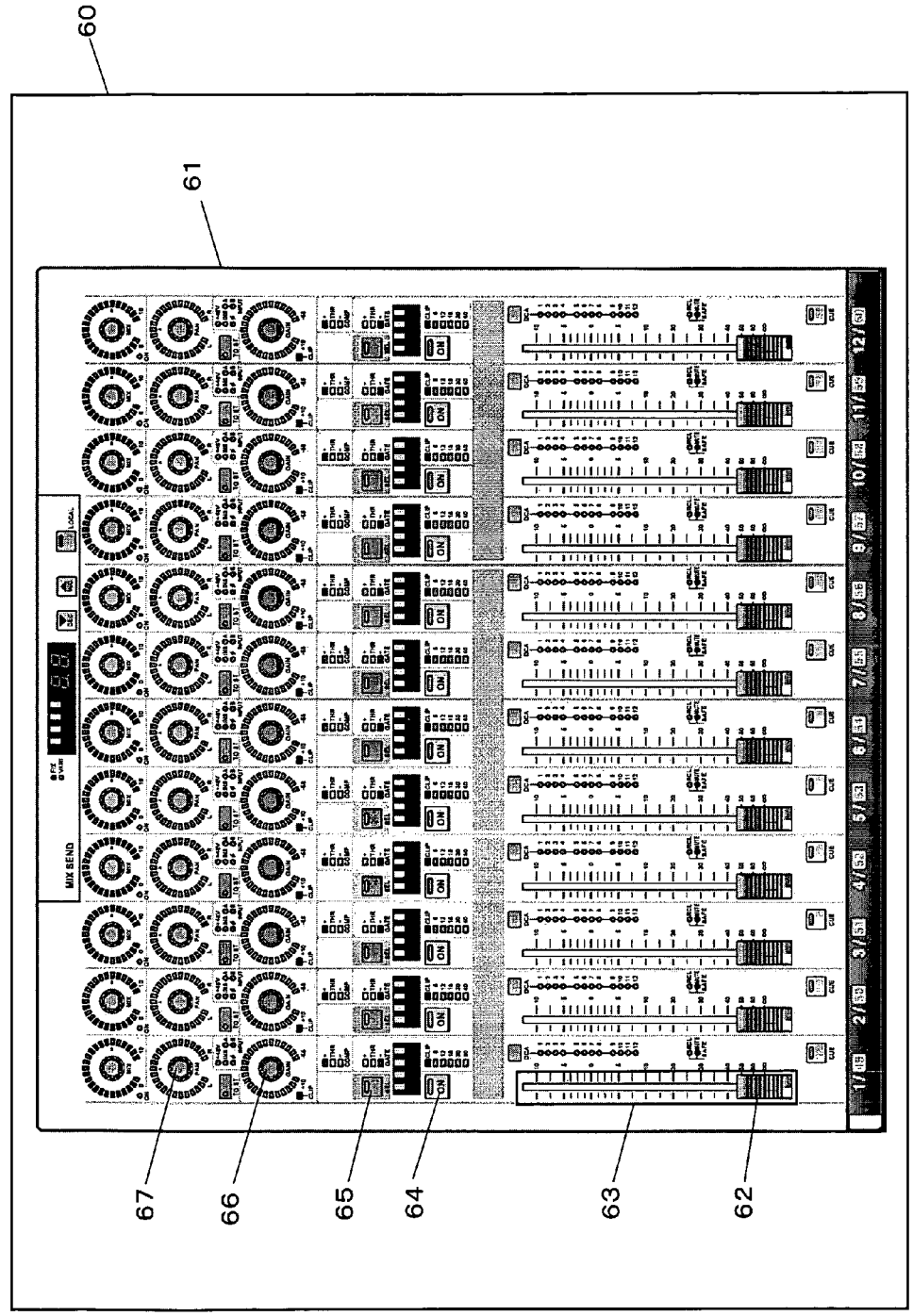
FIG. 5 is a diagram showing an example of a view displayed by a second display shown in FIG. 1.

Here, an example of the view displayed by the first display 50 is shown in FIG. 4, and an example of the view displayed by the second display 60 is shown in FIG. 5 respectively.

First, as shown in FIG. 4, the first display 50 is a display which displays a panel view 51 showing an entire control panel (console) for setting parameters for signal processing in the mixing processor 30. This view corresponds to the console in the conventional mixer, and displays all controls necessary for control of signal processing performed by the mixing processor 30. The view is always displayed while the mixer system is operating.

The user designates the area which the user desires to enlarge and display on the view, and thereby, the view of the enlarged designated area of the console can be displayed by the second display 60. The designation can be accepted as the area being designated, for example, when the panel view 51 is divided into a plurality of areas in advance, and the user touches a portion in a certain area on the view. In this case, it is not necessary to cause the first display 50 to display borders of the areas. Besides, it is conceivable that when a certain area is designated, a predetermined area in the vicinity of the designated are is also regarded as being designated at the same time.

Then, for example, when the user designates the area of a first input operating portion at the position indicated by a white cursor 52 in the panel view 51, a first input operating portion view 61 which is the enlarged view of the first input operating portion is displayed on the second display 60. Note that the cursor 52 shows the area enlarged and displayed on the second display 60, in the view displayed by the first display 50, and is actually displayed after the area to be displayed by the second display 60 is designated.

Meanwhile, the second display 60 is the display which displays an enlarged view of the designated partial area of the console displayed on the first display 50 as described above. Then, the user designates the control on the view displayed on the second display 60, thereby the designated control can be assigned to the control in the operating portion 20 to enable the control in the operating portion 20 to function as the designated control. When such designation and assignment are performed, a cursor 63 is displayed in the view so as to show the control which is assigned to the control in the operating portion 20.

Note that in this case, the control of assignment destination in the operating portion 20 functions as the control for controlling the value of the parameter corresponding to the assigned control. Thus, when the parameter corresponding to the designated control is assigned to the control in the operating portion 20 instead of the control designated in the second display 60, and the control of the assignment destination is caused to function as the control for controlling the value of the assigned parameter, the same action can be also performed resultantly. In this case, what is indicated by the cursor in the second display 60 can be the control corresponding to the parameter assigned to the control in the operating portion 20.

Besides, the control (or the parameter corresponding to the control) designated in the second display 60 is assigned to the control in the corresponding category among the controls in the operating portion 20. For example, a fader 62, which is the control operated by sliding a knob, is assigned to the slider 23 of the operating portion 20. Besides, an ON switch 64 and a selection switch 65, which are the controls operated by depressing buttons, are assigned to the button 21. A gain knob 66 and a pan knob 67, which are the controls operated by rotating knobs, are assigned to the rotary encoder 22, and so on.

Accordingly, it is possible to assign a plurality of controls to the different controls in the operating portion 20 at the same time. Namely, it is possible to assign the fader 62 to the slider 23 and at the same time, assign the ON switch 64 to the button 21. In this case, showing the controls assigned to the controls in the operating portion 20 with the cursor in the second display 60 is the same as the case of the above described cursor 63.

When the control is operated in the operating portion 20, it goes without saying that the value of the parameter for signal processing in the mixing processor 30 is changed in accordance with the operation, and the position and orientation of the controls in the first and the second displays 50 and 60, or displays of a lamp indicating ON/OFF, an indicator and the like are updated in accordance with the operation of the control.

For example, when the slider 23 is operated in the operating portion 20, the display position of the knob of the fader 62 which is assigned to the slider 23 is changed in accordance with the operating amount, and the like in the first and the second displays 50 and 60. Besides, when a level meter or the like displays the content to be changed without the operation of the control, the display contents in the first and the second displays 50 and 60 are changed based on the content of signal processing in the mixing processor 30. The control of these display contents is performed by the controller 10.

Besides, when a certain area is designated and thereafter another area is designated in the first display 50, the display in the second display 60 is changed to that of the later-designated area. In this case, the content of assignment to the control in the operating portion 20 is preferably left irrespective of the display content of the second display 60, but it may be cleared.

Besides, from the above described use purpose, in the second display 60, the view is displayed in such a size that each of the controls can be individually designated. The dimension of the area of the console displayed by the second display 60 at one time, namely, the unit of the area of which designation is accepted on the panel view 51 in the first display 50 is determined with the limit where the view fall within the display area of the second display 60 when display is made with such a size as the reference. Naturally, it is suitable to determine the dimension by also considering the functional grouping of each of the controls at the same time.

On the other hand, in the first display 50, designation of the individual control is not accepted, and therefore, it is preferable that display is made in such a size that the entire console falls within the display area of the first display 50.

In the above mixer system, by the first display 50 and the second display 60, an optional control for setting a parameter (or parameter itself) for signal processing in the mixing processor 30 is assigned to the control in the operating portion 20, and the control in the operating portion 20 is operated, whereby the value of the parameter for the signal processing can be set. In this case, the exclusive controls can be used, and therefore, favorable operability can be realized as compared with the case where the GUI is operated by a pointing device such as a mouse or the like.

Meanwhile, the number of controls as hardware provided in the operating portion 20 can be drastically decreased as compared with the console of the conventional mixer, and thus, the cost down can be achieved.

Besides, even if a number of controls are provided on the view, increase in cost as in the case where a number of physical controls are provided does not occur, and the limitation by the disposition area is small. Accordingly, it is made possible to realize a console enhanced in the degree of freedom of console design, easy to intuitively understand the operating method, and easy to understand a setting state of parameters. Besides, it becomes possible to provide corresponding controls with respect to all the parameters of which values are desired to be operable.

Besides, if the view showing the entire console is always displayed by the first display 50, the values of the parameters in the mixing processor 30, and the content of the signal processing under execution can be intuitively grasped from the display content, especially, the positions of the controls and the states of various kinds of indicators. Note that the size of the view required for visually grasping these kinds of information may be smaller than the size of the conventional console where the physical controls are operated by hand, and the size of the view required when operating the controls with a mouse or the like by using the GUI. Accordingly, even if such a view as satisfies the above requirement is prepared, the area of the first display 50 does not have to be so large.

Besides, by preparing the view showing the entire console, any area in the console can be designated without scrolling the view, and therefore, high operability can be obtained. Further, if the view which displays the designated area is made the view in such a size as falls within the display area of the display, any control can be designated and assigned to the control in the operating portion 20 without scrolling the view, and therefore, higher operability can be obtained. Furthermore, if designation of an area and a control is accepted by using a device with which an area on the view can be directly designated, such as a touch panel and a pen tablet, an operation of moving the pointer is not required, and an intuitive and quick operation is made possible.

Besides, the view showing the entire console is displayed by the first display 50, but since the control is not operated on this view, and designation of an individual control is accepted in the display 60, it is suitable if only designation of the area is possible in the first display 50. In this respect, it is also conceivable that display can be made with a comparatively small screen in the first display 50. Accordingly, even if the second display 60 and the operating portion 20 are provided separately from the first display 50, the mixer system can be made compact as a whole and a necessary space for disposition can be reduced, and carrying can be facilitated, as compared with the case where an exclusive console is provided. Besides, since the portion to be operated is in a narrow range, it is not necessary to move a whole body to operate a control, and thus, operability can be enhanced.

Besides, if the first and the second displays 50 and 60 and the operating portion 20 are composed of separate devices, the disposition relationship of each portion can be freely selected, and therefore, the degree of freedom of disposition can be enhanced.

Further, if the first and the second displays 50 and 60 are composed of displays of a touch panel, a pen tablet or the like, they are capable of being disposed in optional orientations such as horizontal, vertical, diagonal orientation and so on, and therefore, the degree of freedom of disposition can be further enhanced as compared with the conventional console where a large unit needs to be disposed horizontally. In addition, since the parts other than the operating portion 20 and the mixing processor 30 can be composed of general-purpose devices as hardware, a significant cost down is made possible as compared with the case where an exclusive console is provided, and when the mixer system is not used as a mixer system, the devices composing the respective parts can be also used for the other use purposes, and therefore, cost performance of the devices can be enhanced.

Figure 6:
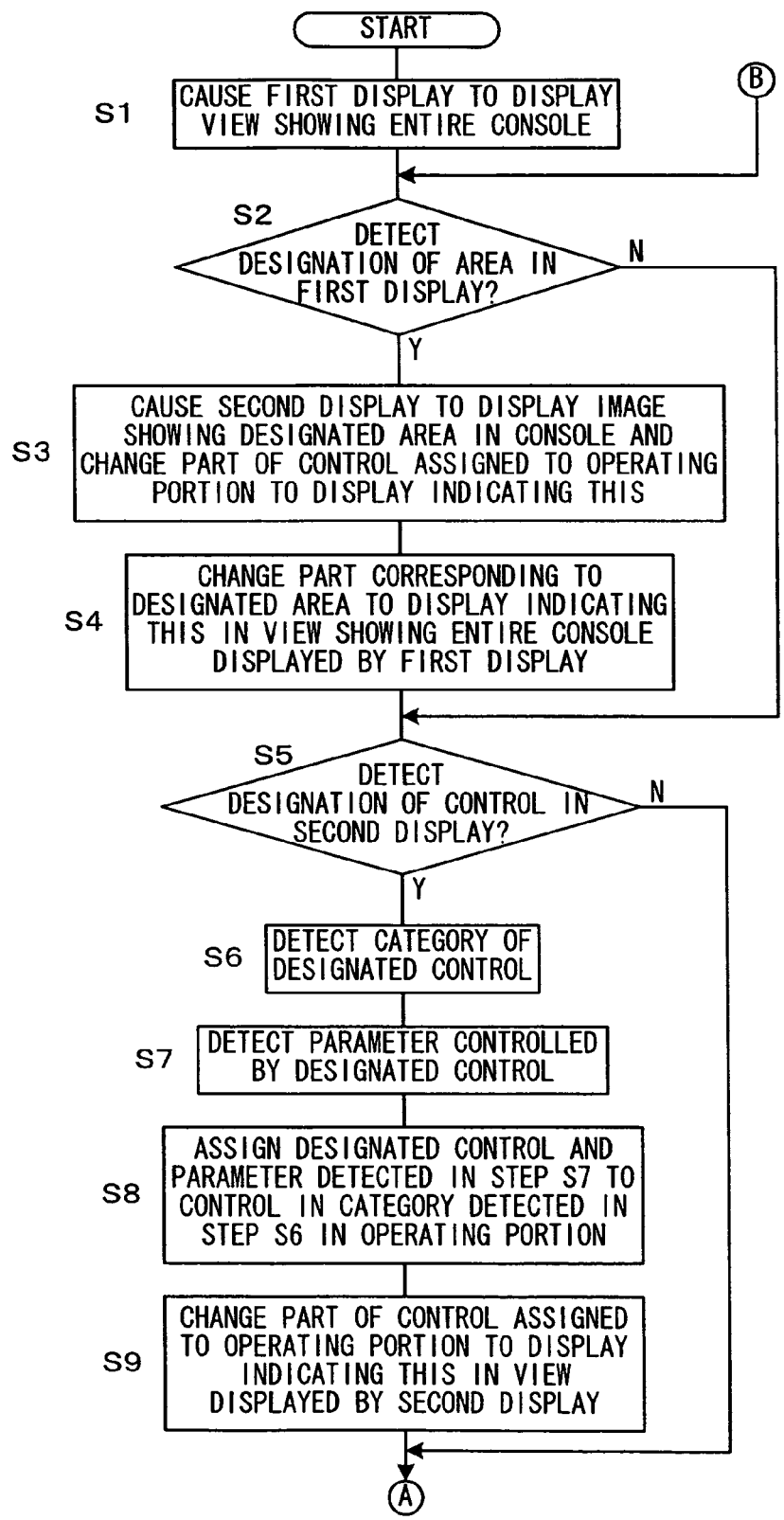
FIG. 6 is a flowchart showing a part of processes executed by a CPU of a controller shown in FIG. 1.
Figure 7:
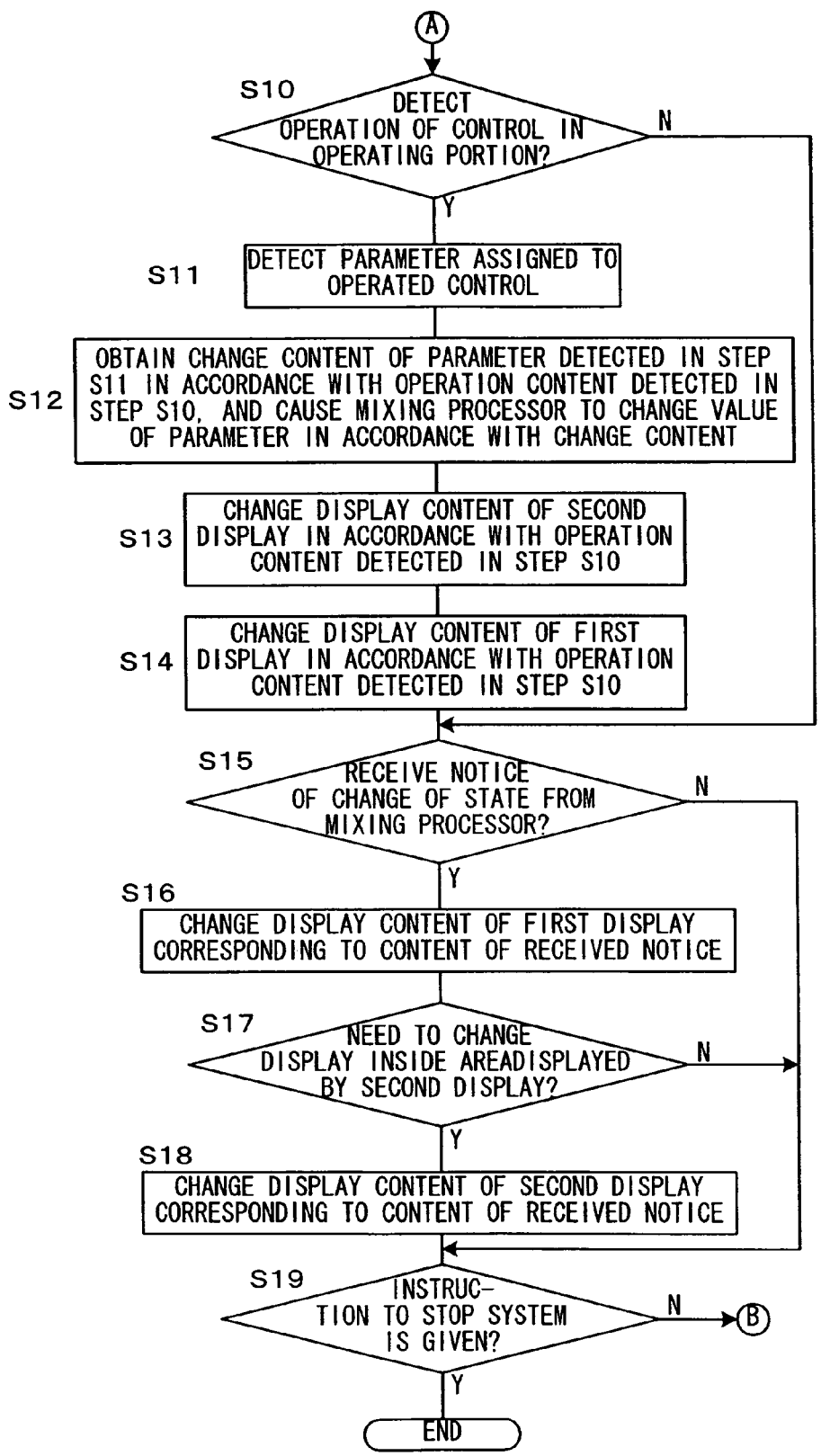
FIG. 7 is a flowchart showing the processes continuing from FIG. 6.

Next, processes which are executed by the CPU 11 of the controller 10 to realize the above described function will be described. FIG. 6 and FIG. 7 are flowcharts showing the processes. However, only the part relating to the above described function is shown, and illustration of the other parts is omitted. In the explanation so far, the example in which the controls on the console which are displayed by the first and the second displays 50 and 60 are assigned to the controls of the operating portion 20, and the example in which the parameters corresponding to the controls are assigned are described, and the flowcharts show the process of assigning both of them.

When the mixer system is actuated, and a predetermined initial process terminates, the CPU 11 of the controller 10 executes a predetermined control program to start the process shown in the flowchart in FIG. 6.

Then, in step S1, the CPU 11 first causes the first display 50 to display the panel view 51 showing the entire console.

Thereafter, in steps S2 to S4, when the CPU 11 detects designation of an area in the first display 50, it causes the second display 60 to display the view showing the designated area, and when the control assigned to the control of the operating portion 20 exists in the area, the CPU 11 causes the second display 60 to make a display showing the control (S3), while it causes the panel view 51 of the first display 50 to make a display showing the designated area (S4).

Note that as the display showing the designated area, the example which displays the cursor 52 enclosing the area is shown in FIG. 4, but the designated area may be shown by a special display different from a display of the other areas such as reverse display of the designated area, half-tone dot meshing, density change, color change and the like. When the designated area differs from what was designated before, the area designated before is returned to the normal display as a matter of course. As for the display showing the control corresponding to the parameter which is assigned to the control of the operating portion 20, the example which displays the cursor 63 that encloses a target control is shown in FIG. 5, but this may be shown by other special displays as described above. When a plurality of controls in the console are assigned to the controls in the operating portion 20, such a display as shows all the assigned controls is made. Besides, the determination in step S2 can be performed based on whether the information to the effect that designation of the area is made is received from the first display 50 or not.

Returning to the explanation of FIG. 6, in the next steps S5 to S9, when the CPU 11 detects designation of the control in the second display 60, the CPU 11 detects the category of the designated control, and the parameter controlled by the designated control (S6, 7), and assigns the control designated in the second display 60 and the parameter which it detects in step S7 to the control in the category, which it detects in step S6, in the operating portion 20 (S8), and further makes a display showing the control which is assigned to the control of the operating portion 20 in the view displayed by the second display 60 (S9).

In the process of this part, determination in step S5 can be made based on whether the CPU 11 receives the information to the effect that the designation of the control is made from the second display 60 or not, and when monitoring the information, the CPU 11 functions as an accepting device.

Besides, the detection in steps S6 and S7 can be made by storing in advance information of the category of the control and the corresponding parameter in the ROM 12, the HDD 14 or the like with respect to each control included in the console displayed by the first display 50, and referring to this.

FIG. 8 shows an example of such information, and in the example, for each area on the console which is selectable in the first display 50, a name of each control included in the area, and information of the category of the control are included. The category preferably corresponds to the category of the control provided in the operating portion 20, and otherwise, it is necessary to set correspondence of the category and the control to be the assignment destination additionally. Besides, it is suitable to set the category of each control so that assignment is performed to the control (in the operating portion 20) in the same or similar shape as or to the shape displayed on the view in step S8.

Besides, in the example shown in FIG. 8, the information of the kind of the parameter controlled by the control is included in the information of the control, and this information is described for a plurality of layers. In the digital mixer, in order to reduce the number of controls provided in the console, a plurality of layers in which the kinds of parameters to be assigned to the respective controls are set are prepared, so that a plurality of parameters can be controlled with the same control by switching the layers in some cases, and by preparing the information of a plurality of layers as in FIG. 8, this mixer system can be given such a layer function.

Then, in the process in step S7, by searching the table shown in FIG. 8 with the information of the designated control and the information of the layer selected at the time of the designation as a key, the information of the parameter controlled with the designated control can be obtained. It is a matter of course that controls for selecting layers may be provided on the console displayed by the display. However, the number of controls for selecting layers is small, and therefore, it is conceivable to provide them in the operating portion 20 separately.

The information about each control is not limited to the form shown in FIG. 8, and it is not essential to prepare information about a plurality of layers.

Besides, it is preferable that assignment in step S8 is performed only for the control in the category detected in step S6, in the operating portion 20, and the content of assignment to the other controls than this is not changed. In this process, the CPU 11 functions as an assigning device.

The display in step S9 may be the same as in the case of step S3. Further, also in the view of the first display 50, the display showing the control assigned to the control in the operating portion 20 may be performed.

After step S9, the flow goes to the process of step S10 and the following in FIG. 7, and in steps S10 to S14, when the CPU 11 detects the operation of the control in the operating portion 20, it causes the mixing processor 30 to change the value of the parameter assigned to the control in accordance with the operation content (S11, S12), and change the display contents of the first and second displays 50 and 60 corresponding to the detected operation content (S13, S14).

Note that in the flowchart in FIG. 7, the process of steps S11 and S12 is described as setting the change content of the parameter on the controller 10 side, but the information of the control on the console which is assigned to the operated control and information of the operating amount of the control may be transmitted to the mixing processor 30, and the kind of the parameter to be changed and the change content may be set on the mixing processor 30 side.

Besides, the process of steps S13 and S14 is to cause the position and orientation of each control displayed on the first and the second displays 50 and 60, the display content of an indicator, or the like to correspond to the value of the parameter in the mixing processor 30. As the process, the same process as the process of moving the position of the control on the view and updating the display of the indicator in accordance with the operation of a user in the conventional GUI can be utilized.

Besides, it is conceivable that depending on the kind of a control, the position of the control in the operating portion 20 do not correspond to the position of the control on the view and the value set to the corresponding parameter at the time of assignment in step S8 in FIG. 6. As the countermeasure in such a case, it is conceivable that when the control in the operating portion 20 is somewhat operated, the position of the control on the view and the value of the corresponding parameter are changed to those corresponding to the position of the operated control, or the position of the control on the view and the value of the corresponding parameter are not changed until the control in the operating portion 20 is once moved to the position corresponding to the control on the view, and thereafter, they are changed in accordance with the operation of the control in the operating portion 20.

Then, after step S14, in steps S15 to S18, when receiving notice of a change of state from the mixing processor 30, the CPU 11 changes the content of the view displayed by the first display 50 in accordance with the content of the notice (S16), and similarly changes the display content if change of the part displayed by the second display 60 is necessary (S17).

Here, the notice of the change of state is the notice which the mixing processor 30 sends to the controller 10 to transmit the change of state when such a change of state as requires addition of change to the displays of the first and second displays 50 and 60 occurs, among the changes of state occurring in the mixing processor 30 irrespective of the operation of the controls in the operating portion 20 and the operation of designating the areas and controls in the first and the second displays 50 and 60, and the like. As such a change of state, for example, a level change of an inputted audio signal and a level change of an audio signal to be outputted are conceivable.

By the process of this part, the contents of the views displayed by the first and the second displays 50 and 60 can be changed in accordance with the content of signal processing in the mixing processor 30.

Then, after step S18, the CPU 11 determines whether an instruction to stop the system is given or not in step S19. When the instruction is given, it terminates the process, and when it is not, it returns to step S2 to repeat the process.

By the above processes, the function of the mixer system of the embodiment as described above can be realized. Note that in the above processes, the CPU 11 functions as the first display controller in the process of controlling the display content of the first display 50, and the CPU 11 functions as the second display controller in the process of controlling the display content of the second display 60.

Besides, in the above processes, the example in which both the control in the console and the parameter to be controlled are assigned to the control in the operating portion 20 is described in step S9, and they are correspond to each other. Therefore, if there is information as shown in FIG. 8 and information of a layer or the like as necessary, it is easy to derive one from the other. Accordingly, even when only one of a control and a parameter is assigned to the control in the operating portion 20, if the information of the other is derived as necessary, it is possible to realize an equivalent function to the case of the processes shown in the flowcharts in FIG. 6 and FIG. 7.

Besides, in the above described mixer system, the example in which the operating portion 20 is provided with one control of each category is described, but a plurality of controls may be provided in each category. In this case, it is preferable that the form in which a plurality of slots each having one control of each category are provided is adopted.

In such a case, a device that designates to which control in the operating portion 20 a control is assigned when the control is selected in the second display 60 is separately provided. As such a device, for example, it is conceivable that a control such as a key or the like for designating a slot is displayed by the second display 60, so that a slot at an assignment destination can be designated by operating the control. A control of which category in the slot becomes the assignment destination can be set similarly to the case of the above described embodiment.

Besides, in the above described mixer system, the example in which only a designation of the control is accepted in the second display 60 is described. However, in the second display 60, designation of the area to be further enlarged in the view can be accepted as in the case of the first display 50, so that an image of the console may be gradually enlarged stepwise. When the construction of the console displayed by the first display 50 is especially complicated partially, such a construction is effective.

In such a case, it is preferable that, when designation of an area to be enlarged is accepted in the second display 60, the display of the second display 60 is switched to a view of an enlarged part of the area which are displayed in accordance with the designation, and the view showing the entire console is always displayed by the first display 50. Then, when the display of the second display 60 is returned to an upper (enlargement degree is small) view, an area which is displayed by the second display 60 is newly designated in the first display 50.

Besides, it is also applicable that, in the second display 60, both designation of a control to be assigned to a control in the operating portion 20 and designation of an area to be enlarged may be accepted in one view. The same applies to the first display 50 in this respect, and it is conceivable that when an inside of a predetermined area in the view is designated, the control is treated as being directly designated.

Besides, in the mixers, some of them have a function of assigning an optional parameter selected from a plurality of candidates to a predetermined control, and thereby making it possible to control the value of the assigned parameter by operating the control. In the above described mixer system, such a function can be realized. For this purpose, for example, a control for operating an assignment operation of a parameter is prepared on the console displayed by the display, and the control is first assigned to the control on the operating portion 20 and operated, whereby assignment of the parameter to the above described predetermined control is performed. As for the control which becomes the assignment destination of the parameter, in the information of the control on the console as shown in FIG. 8, the information of the parameter corresponding to the control is made changeable, and this is changed in accordance with the assigned parameter.

Besides, the operating portion 20 may be also provided with the display by an LED or the like, and the display may be caused to make display corresponding to the value of a parameter assigned to the control on the operating portion 20.

Besides, in the above described embodiment, the example in which the components shown in FIG. 1 are respectively composed by separate devices is described, but this is not essential. For example, the controller 10 and the mixing processor 30 may be composed as one device. This is because if the mixing processor 30 includes a CPU having a sufficient processing speed, it is possible to cause the CPU to perform processes corresponding to the controller 10.

Besides, the first display 50 and the second display 60 may be provided on the same display. In this case, it is preferable to divide a display area which is caused to function as the first display 50 and a display area which is caused to function as the second display 60 on the display. A display control, which does not cause the entire image of the console displayed by the first display 50 and the partial image displayed by the second display 60 to overlap each other, but makes it possible to always recognize them at the same time, is performed.

Other than the above, the configuration in which all the respective parts shown in FIG. 1 are housed in one casing is not excluded. In this configuration, reduction in size and cost is also possible as compared with the configuration in which a number of controls are provided on a panel. On the other hand, it is not excluded that the operating portion 20 and the mixing processor 30 are composed by being divided into a plurality of casings.

Besides, the members for realizing each of the components are not limited to those in the above described embodiment. For example, the display may be composed of a device other than a touch panel and a pen tablet if only the device is such a device as can designate a desired area and control simply and intuitively by utilizing a displayed image.

Further, the application target of the invention is not limited to the mixers, but the invention is applicable to any apparatus using a console provided with controls, and the invention is suitably applied especially to such an apparatus as needs to be operated by using a number of controls.

Further, the above-described program of the invention can provide the same effect when it is provided by being recorded in a nonvolatile recording medium (memory) such as a CD-ROM, a flexible disk or the like, and this program is read to the RAM 13 of the controller 10 from the memory to cause the CPU 11 to execute the program, and when the program is downloaded from an external device including the recording medium recording the program or an external device storing the program in a memory such as an HDD or the like, and executed, as well as when the program is stored in the HDD or the like of the controller 10 in advance.

As explained thus far, according to the mixer controller, the mixer system or the program of the present invention, a number of parameters used in signal processing in a digital mixer can be set with a compact console with high operability. Accordingly, when the invention is utilized, a mixer device and a mixer system with high operability can be provided.

What is claimed is:

1. A mixer controller comprising:
   a first display;
   a second display;
   an operating portion provided with a plurality of physical controls, each physical control belonging to a category, and each category classified in accordance with a shape;
   a first display controller that causes the first display to display a view showing an entire console for controlling a parameter for signal processing in a mixing processor that processes audio signals from input channels and outputs the audio signals to output channels;
   a second display controller that causes the second display to display a view showing a designated partial area of the console, the designated partial area including a plurality of channels;
   an accepting device that accepts designation, by a user, of any control, to be assigned to a physical control on the operating portion, in the view displayed by the second display;
   an assigning device that assigns a parameter corresponding to the control of which designation the accepting device accepts, to a physical control in a category having the same shape as that of the control of which the designation is accepted, in the operation portion; and
   a parameter controller that causes the mixing processor to change a value of a parameter assigned to the physical control by the assigning device, in accordance with an operation when the physical control is operated.

2. A mixer controller according to claim 1, wherein said first display controller is provided with a display controller that updates a display content of the view showing the entire console in accordance with a content of signal processing in the mixing processor, and said second display controller is provided with a display controller that updates a display content of the view showing the partial area in accordance with the content of the signal processing in said mixing processor.

3. A mixer controller according to claim 1, wherein said first display and said second display are displays that are included in different devices.

4. A mixer controller according to claim 1, wherein the view displayed by said first display is a view that displays the entire console in a state with no need of a scroll.

5. A mixer controller according to claim 1, wherein the view showing the entire console is always displayed by the first display while the mixer controller is operating.

6. A mixer controller according to claim 1, wherein the view displayed by said second display is a view showing the designated partial area by enlarging it to such a size that controls can be individually designated.

7. A mixer controller according to claim 1, wherein the view showing the entire console is divided into a plurality of areas in advance, and by a divided unit, designation of an area to be displayed by said second display is accepted.

8. A mixer controller according to claim 1, wherein said first display controller is provided with a device that makes a special display different from that of other areas for the area that is designated as an area to be displayed by said second display, in the view displayed by said first display.

9. A mixer controller according to claim 1, wherein said second display controller is provided with a device that makes a special display different from that of other parts for the control of which designation said accepting device accepts, in the view displayed by said second display.

10. A mixer controller according to claim 1, wherein said first display is a display comprising a touch panel or a pen tablet, and designation of the area to be displayed by said second display is accepted by touch or a pen.

11. A mixer controller according to claim 1, wherein said second display is a display comprising a touch panel or a pen tablet, and said accepting device accepts designation of the control by touch or a pen.

12. A mixer system, comprising:
    a first display;
    a second display;
    an operating portion provided with a plurality of physical controls, each physical control belonging to a category, and each category classified in accordance with a shape;
    a mixing processor that processes audio signals from input channels and outputs the audio signals to output channels;
    a first display controller that causes said first display to display a view showing an entire console for controlling a parameter for signal processing in said mixing processor;
    a second display controller that causes said second display to display a view showing a designated partial area of the console, the designated partial area including a plurality of channels;
    an accepting device that accepts designation, by a user, of any control, to be assigned to a physical control on the operating portion, in the view displayed by said second display;
    an assigning device that assigns a parameter corresponding to the control of which designation the accepting device accepts, to a physical control in a category having the same shape as that of the control of which the designation is accepted, in said operating portion; and
    a parameter controller that causes said mixing processor to change a value of a parameter assigned to said physical control by the assigning device, in accordance with an operation when said physical control is operated.

13. A computer readable medium encoded with a computer program containing program instructions executable by a computer and causing said computer to execute:
    a first display control process of causing a first display to display a view showing an entire console for controlling a parameter for signal processing in a mixing processor that processes audio signals from input channels and outputs the audio signals to output channels;

a second display control process of causing a second display to display a view showing a designated partial area of the console, the designated partial area including a plurality of channels;

an accepting process of accepting designation, by a user, of any control, to be assigned to a physical control on the operating portion, in the view displayed by said second display, wherein the operating portion is provided with a plurality of physical controls, each physical control belonging to a category, and each category classified in accordance with a shape;

an assigning process of assigning a parameter corresponding to the control of which designation is accepted in the accepting process, to a physical control in a category having the same shape as that of the control of which the designation is accepted, in the operating portion; and a process of causing the mixing processor to change a value of a parameter assigned to the physical control by the assigning device, in accordance with an operation when the physical control is operated.

* * * * *